United States Patent
Yang et al.

(10) Patent No.: US 7,489,323 B2
(45) Date of Patent: Feb. 10, 2009

(54) DISPLAY APPARATUS ADAPTED FOR A DISPLAY WALL, IMAGE ADJUSTMENT METHOD THEREFOR AND DISPLAY WALL THEREWITH

(75) Inventors: Jung-Yi Yang, Taoyuan County (TW); Fang-Tien Chen, Taoyuan County (TW); Chang-Hsien Fan, Taoyuan County (TW)

(73) Assignee: Delta Electronics, Inc., Taoyuang County (TW)

( * ) Notice: Subject to any disclaimer, the term of this patent is extended or adjusted under 35 U.S.C. 154(b) by 180 days.

(21) Appl. No.: 11/328,866

(22) Filed: Jan. 10, 2006

(65) Prior Publication Data

US 2007/0159498 A1 Jul. 12, 2007

(51) Int. Cl.
*G09G 5/14* (2006.01)
(52) U.S. Cl. ...................... 345/660; 345/600
(58) Field of Classification Search .............. 345/600, 345/660
See application file for complete search history.

(56) References Cited

U.S. PATENT DOCUMENTS

| | | | | |
|---|---|---|---|---|
| 6,011,566 | A * | 1/2000 | Salamon | 345/600 |
| 6,507,677 | B2 * | 1/2003 | Miura et al. | 382/299 |
| 6,587,602 | B2 * | 7/2003 | Wakisawa et al. | 382/298 |
| 6,816,141 | B1 * | 11/2004 | Fergason | 345/88 |
| 7,173,620 | B2 * | 2/2007 | Endoh et al. | 345/428 |
| 2002/0069220 | A1 * | 6/2002 | Tran | 707/503 |

(Continued)

OTHER PUBLICATIONS

Li, K.; Chen, H.; Chen, Y.; Clark, D.W.; Cook, P.; Damianakis, S.; Essl, G.; Finkelstein, A.; Funkhouser, T.; Housel, T.; Klein, A.; Liu, Z.; Praun, E.; Singh, J.P.; Shedd, B.; Pal, J.; Tzanetakis, G.; Zheng, J.;Building and using a scalable display wall system Computer Graphics and Applications, IEEE vol. 20, Issue 4, Jul.-Aug. 2000 p. 2.*

Session P11: visualization systems and image-based visualization: Scalable alignment of large-format multi-projector displays using camera homography trees Han Chen, Rahul Sukthankar, Grant Wallace, Kai Li Oct. 2002 Proceedings of the conference on Visualization '02 VIS '02.*

*Primary Examiner*—Kee M Tung
*Assistant Examiner*—Javid A Amini
(74) *Attorney, Agent, or Firm*—Patterson, Thuente, Skaar & Christensen, P.A.

(57) ABSTRACT

A display apparatus adapted for a display wall, an image adjustment method therefor and a display wall therewith are provided. The image between display apparatuses of the display wall is not exactly displayed, especially for adjacent areas between every two neighbored display apparatuses, and the displayed image is required to be adjusted for the defects. The image adjustment method includes receiving a video signal and then setting an initial image capture area in a scaler of each of display apparatuses in the display wall for selecting and scaling a part of the video image and transmitting the part to a digital display element of the display apparatus for display. Then based on the whole image displayed on the display wall by combining the image displayed on each of the display apparatuses, sequentially adjusts the image displayed by each of the display apparatuses. While adjusting the size of the image, one side of an image capture area is fixed and the length of the image capture area is adjusted. A scaling factor is simultaneously updated according to the adjusted length of the image capture area. The precision degree for the adjusted images can be a pixel in a horizontal direction and a line in a vertical direction for the displayed images and a complete and more perfect image can be obtained by the adjustment method.

11 Claims, 7 Drawing Sheets

U.S. PATENT DOCUMENTS

| | | | |
|---|---|---|---|
| 2002/0102998 A1* | 8/2002 | Lin | 455/466 |
| 2002/0167531 A1* | 11/2002 | Baudisch | 345/611 |
| 2005/0125488 A1* | 6/2005 | Kulkarni et al. | 709/201 |
| 2005/0188298 A1* | 8/2005 | Makela | 715/503 |
| 2005/0237342 A1* | 10/2005 | Stamm et al. | 345/613 |
| 2006/0203286 A1* | 9/2006 | Yoshino | 358/1.15 |
| 2006/0230100 A1* | 10/2006 | Shin et al. | 709/203 |
| 2006/0232671 A1* | 10/2006 | Yasunaga et al. | 348/143 |

\* cited by examiner

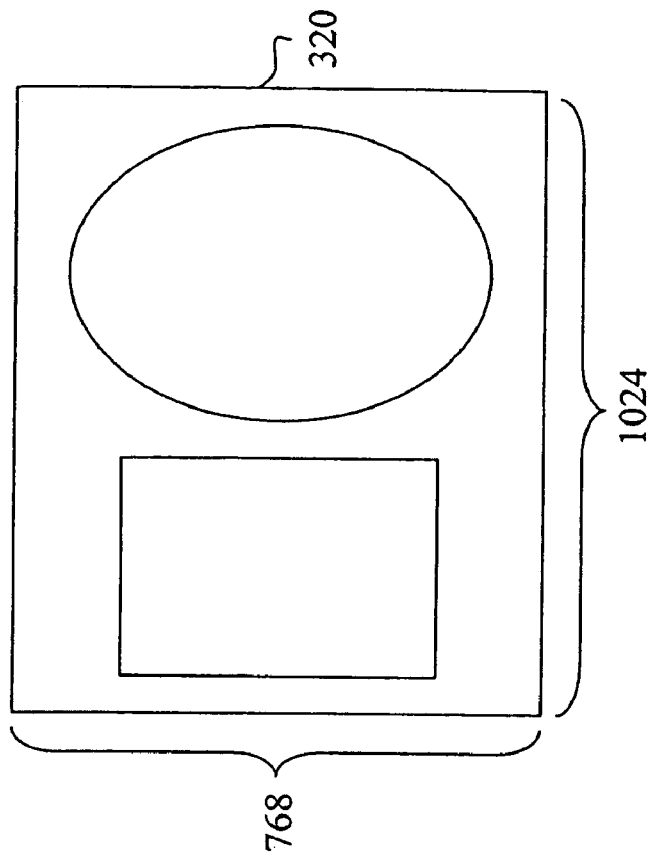
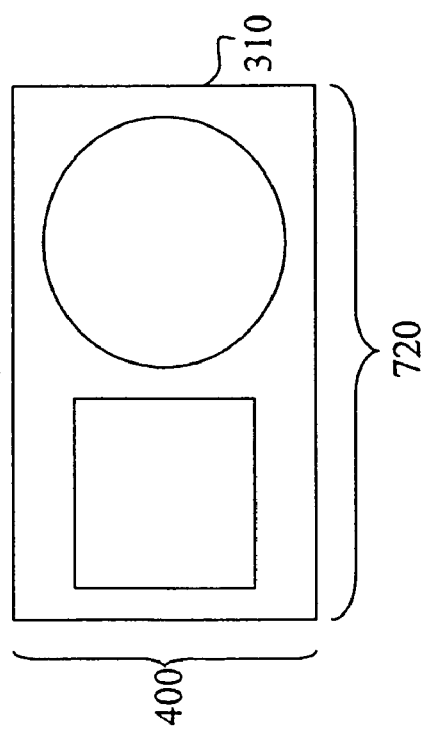
Fig. 3B
Fig. 3A

DISPLAY APPARATUS ADAPTED FOR A DISPLAY WALL, IMAGE ADJUSTMENT METHOD THEREFOR AND DISPLAY WALL THEREWITH

BACKGROUND OF THE INVENTION

1. Field the Invention

The present invention relates to a display apparatus adapted for a display wall, an image adjustment method therefor and a display wall therewith, specifically to a digital display apparatus adapted for a display wail, an image adjustment method and a display wall therewith.

2. Descriptions of the Related Art

In recent years, display walls were popularly used in occasions with large-scale displays. The display wall is arranged by combining several display apparatuses together. Each display apparatus selects a part of image according to the corresponding arranged position and scales to a full-screen size of the display apparatus. All the combined display apparatuses therefore jointly display a whole image of the input signal.

FIG. 1 is a diagram of a display wall consisting of 3×3 display apparatuses. In FIG. 1, 100 is a video source and 111, 112, 113, 121, 122, 123, 131, 132 and 133 are nine display apparatuses which are combined into a 3×3 display wall. A video signal of the video source 100 is connected individually to each display apparatus in an order of signal lines 140, 141, 142, 143, 144, 145, 146, 147 and 148 to transmit the video signal in cascade to all of the display apparatuses through the signal lines in serial. Each cascaded display apparatus selects a corresponding part of the image according to the arranged position and scales the selected part to display. The scaled displays are therefore jointly combined into an enlarged one of the original image.

Due to the features of clearness, sharpness and lossless in transmission of a digital display technique as compared with traditional analog display techniques, digital display elements (such as LCD, PDP, DMD) have replaced traditional analog display elements gradually to become a new generation of display apparatuses in recent years. For CRT-based display apparatuses, both size and position of an output image can be controlled by adjusting a horizontal deflection and a vertical deflection. For those digital displays of new generation, a scaler is usually equipped internally for image scaling and frame rate conversion. The adjustment of the image size and display position can be achieved by controlling a scaling factor of the scaler and an initial image capture position for an input image respectively.

The prior art display techniques relating to digital scaling provide a set of preset scaling modes (such as scaling to a full-screen of the display apparatus, maintaining a fill aspect ratio, maintaining a native-resolution) for users to select one of the scaling modes to set the scaling factor of the display apparatus. The preset scaling modes are not suitable for adjusting image for individual display apparatus used in the display wall. This is because that in the application of display walls individual display apparatus may fine-tune its scaling factor and position according to corresponding arranged position to combine individually displayed image into a whole continuous and complete image.

In order to achieve the image continuity between each two adjacent display apparatuses, the position of the input image is adjusted usually in the past. A drawback in such way is that a precision degree to adjust the output image relates to the current scaling factor of the image.

For example, one pixel movement of a pixel in the input image is enlarged to a two-pixel movement of the horizontal signal of the output image if an image has been enlarged into two times in horizontal. Consequently, the adjustment method cannot keep continuity of the displayed image between neighbored display apparatuses. The major image discontinuity is due to the image scaling problem in multiplication of fraction numbers. Taking a 3×3 display wall as an example, if a display screen with an XGA (Extended Graphics Array) resolution (i.e., 1024×768) is scaled to a display wall with 3×3 display apparatuses, the horizontal input signal should be averagely divided into 1024/3=341.3. However, the minimum unit for the input image is one pixel in a digital image system. Consequently, choosing 341 pixels for scaling results in a shortage of some part of the displayed image; choosing 342 pixels for scaling results in a replication of some part of the displayed image. These lead to the image discontinuity between neighbored display apparatuses among the display wall.

The prior art applications about the digital scaling display provide sets of scaling modes such as scaling to a fill-all screen of the display apparatus, maintaining a fill aspect ratio, maintaining native-resolution, etc. For a convenient understanding, please refer to FIG. 3A to FIG. 3D as an example. In FIG. 3A, an image 310 is a captured image with a 720×400 resolution. The desired output resolution of the display apparatus is 1024×768, for example. If a scaling mode is scaling to a fill-all screen of the display apparatus, the output screen is shown as a display screen 320 in FIG. 3B that the scaled screen fills the whole display apparatus. However, the difference between horizontal and vertical scaling aspect ratios of the image will cause the loss in maintaining horizontal and vertical aspect ratio of the image to be displayed.

If a scaling mode is scaling with maintaining a fill aspect ratio, the output screen is shown as a display screen 330 in FIG. 3C that maintains the horizontal and vertical aspect ratio of the original screen. However, each top and bottom side of the display screen leaves an empty area of 1024×100 approximately. If a scaling mode is scaling with maintaining native-resolution, the output screen is shown as a display screen 340 in FIG. 3D that maintains the original display resolution (i.e., 720×400). However, an empty area is left in the surrounding area of the display screen. Users can select one of the said scaling modes depending on the usage conditions or preferences. However, the preset scaling modes cannot be applied for the display wall applications. While combining multiple display apparatuses to display an image, sometimes the scaling factor must be fine-tuned with the precision degree of a pixel in horizontal or a line in vertical to combine the image display areas perfectly and completely.

SUMMARY OF THE INVENTION

In consideration of the said drawbacks, this invention proposes an image scaling adjustment method adapted for a display device, especially an image scaling adjustment method adapted for a display wall. The feature of this method is to adjust a scaling factor of the image with a precision degree of a pixel in horizontal or a line in vertical for fine-tuning.

An object of this invention is to provide an image adjustment method adapted for a display wall comprising a plurality of display apparatuses. A video signal is received by each display apparatus of the display wall separately. Based on an arranged position in the display wall, each display apparatus captures a part of the image frame of the video signal according to an initial setting and then scales it to be displayed on a digital display element of the display apparatus, wherein the display apparatuses set a horizontal display length and a vertical display length according to the resolution of adopted digital display elements. In one embodiment for a horizontal tuning process, either a right side or a left side of the image of the display apparatus of the display wall is fixed and a horizontal capture image length is then adjusted. In another selected embodiment for a vertical tuning process, either a top side or a bottom side of the image of the display apparatus of the display wall is fixed and a vertical capture image length is then adjusted. The displayed image of each display apparatus is adjusted sequentially to keep a whole image consistency of the neighbored images displayed by the display wall. By using the image adjustment method of this invention, the displayed image can achieve a very high precision degree. For example, while adjusting the horizontal capture image length of the displayed image of the display apparatus, the adjustment is in a unit of an increment or a decrement of a pixel. While adjusting the vertical capture image length of the displayed image of the display apparatus, the adjustment is in a unit of an increment or a decrement of a line. Consequently, a quite well quality is achieved for the whole neighbored images displayed by the display wall by using this invention.

While adjusting the displayed image of each display apparatus sequentially according to the whole image displayed by the display wall, either the left side or right side of the displayed image of the adjusting display apparatus of the display wall is fixed. By increasing or decreasing a pixel as an adjustment unit, the horizontal capture image length of the displayed image is adjusted. While the horizontal capture image length of the displayed image of the display apparatus is increased or decreased, a horizontal scaling factor of the scaler is updated, wherein the scaling factor is set by the value of dividing the horizontal display length by the adjusted horizontal capture image length.

While adjusting the displayed image of each display apparatus sequentially according to the whole image displayed by the display wall, either the top side or bottom side of the displayed image of the adjusting display apparatus of the display wall is fixed. By increasing or decreasing a line as an adjustment unit, the vertical capture image length of the displayed image is adjusted. While the vertical capture image length of the displayed image of the display apparatus is increased or decreased, a vertical scaling factor of the scaler is updated, wherein the vertical scaling factor is set by the value of dividing the vertical display length by the adjusted vertical capture image length.

Another object of this invention is to provide a display wall comprising a plurality of display apparatuses for receiving a video signal. By partitioning the corresponding image frame of the video signal, each display apparatus is assigned to display a corresponding part of the image. After combining the display apparatuses, a whole image is displayed corresponding to the video signal, wherein the display apparatuses set a horizontal display length and a vertical display length according to the resolution of adopted digital display elements. According to the whole image displayed by the display wall, each part of the whole image displayed by each display apparatus is adjusted sequentially, wherein the adjustment steps are to fix either the top side or the bottom side of the image displayed by the adjusting display apparatus of the display wall and then to adjust a vertical capture image length of the displayed image in an adjustment unit of increasing or decreasing a line. While the vertical capture image length of the displayed image of the display apparatus is increased or decreased, a vertical scaling factor of the scaler is updated according to the adjusted vertical capture image length, wherein the vertical scaling factor is set by the value of dividing the vertical display length by the adjusted vertical capture image length.

This invention also provides another display wall comprising a plurality of display apparatuses for receiving a video signal. By partitioning the corresponding image frame of the video signal, each display apparatus is assigned to display a corresponding part of the image. After combining the display apparatuses, a whole image is displayed corresponding to the video signal, wherein the display apparatuses set a horizontal display length and a vertical display length according to the resolution of adopted digital display elements. According to the whole image displayed by the display wall, each part of the whole image displayed by each display apparatus is adjusted sequentially, wherein the adjustment steps are to fix either left side or right side of the image displayed by the adjusting display apparatus of the display wall and then to adjust a horizontal capture image length of the displayed image in an adjustment unit of increasing or decreasing a pixel. While the horizontal capture image length of the displayed image of the display apparatus is increased or decreased, a horizontal scaling factor of the scaler is updated according to the adjusted horizontal capture image length, wherein the horizontal scaling factor is set by the value of dividing the horizontal display length by the adjusted horizontal capture image length.

Yet a further object of this invention is to provide a digital display apparatus for adjusting an image horizontally and vertically. The digital display apparatus comprises a digital display element for displaying an image and a scaler for receiving a video signal and capturing all or a part of an image from the video signal to output a display image signal to the digital display element after processing. The display apparatus determines an image size output by the scaler according to a resolution of the digital display element. While adjusting the size of the image, one side of an image capture area of the scaler is fixed and the length of the image capture area is either increased or decreased. A scaling factor of the scaler is updated according to the adjusted length of the image capture area to scale the image content of the image capture area to the size of the output display screen.

For more obvious and easy understanding of said other purposes, features and advantages of the subject invention, the detailed descriptions are described in the following paragraphs accompanying the preferred embodiments and the appended drawings.

BRIEF DESCRIPTION OF THE DRAWINGS

FIG. 3A-3D is a schematic view of prior art scaling modes of digital displays;

DESCRIPTION OF THE PREFERRED EMBODIMENT

Figure 1:
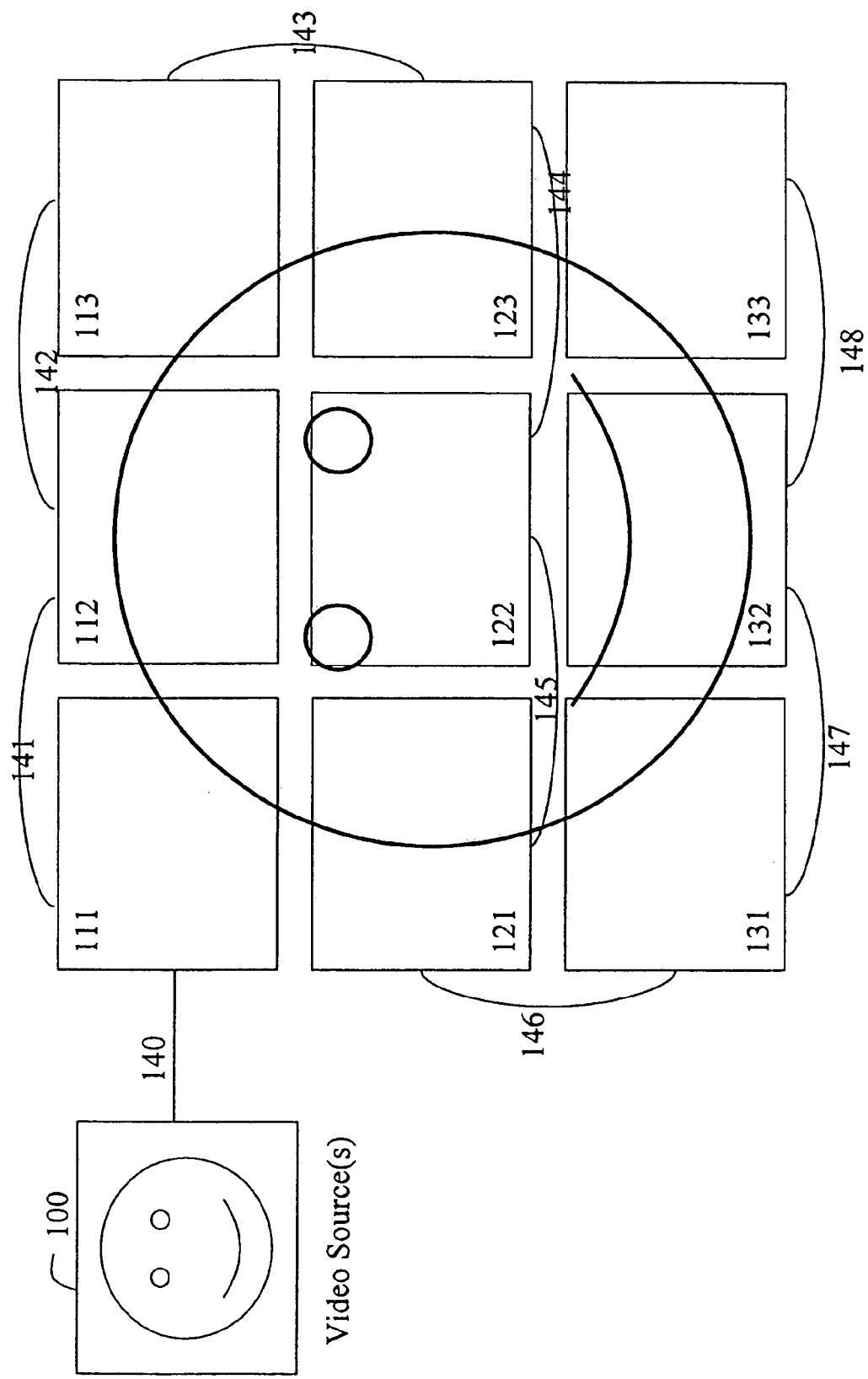
FIG. 1 is a schematic view of a display wall with 3×3 display apparatuses and corresponding display contents.
Figure 2:
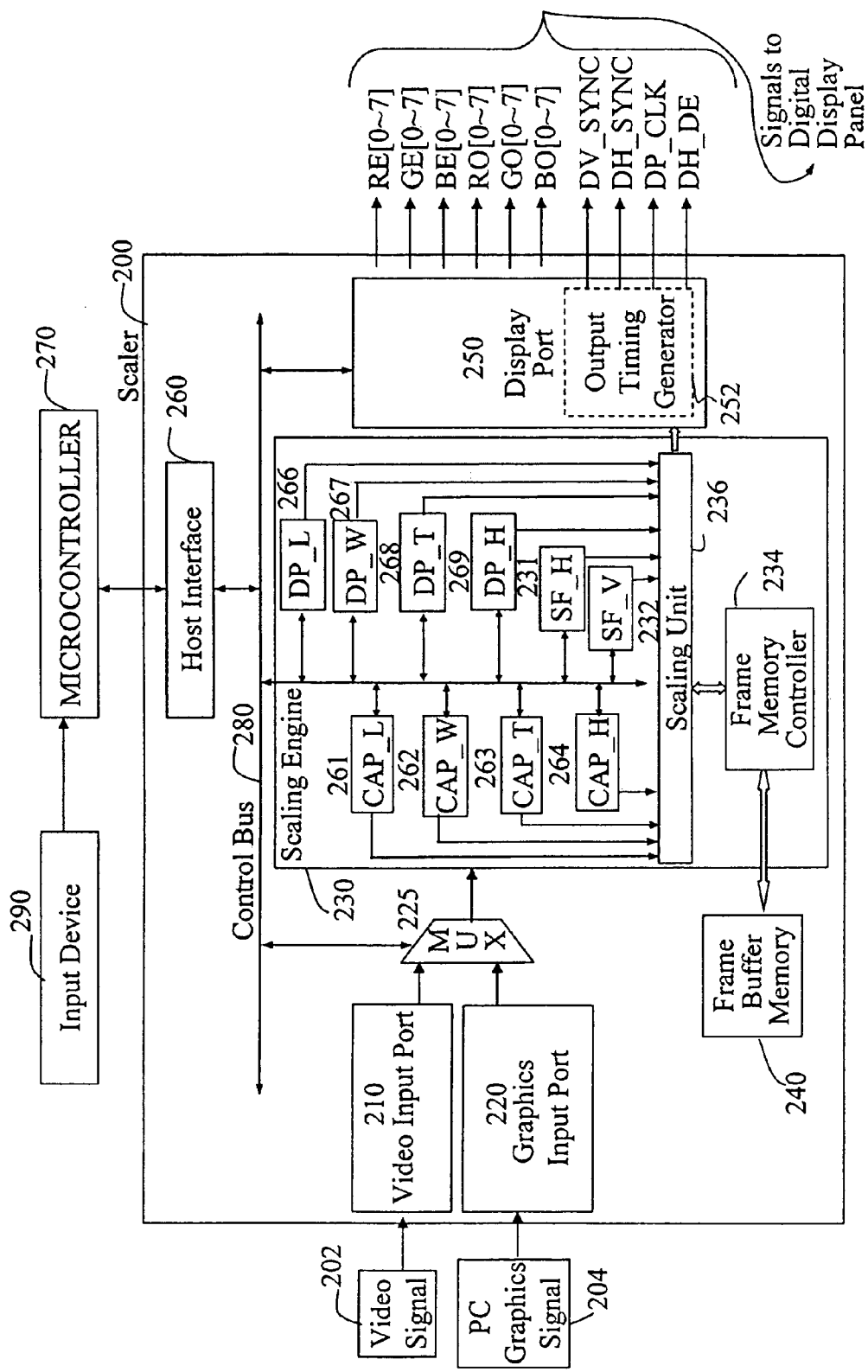
FIG. 2 is an internal circuitry block diagram of a scaler disclosed in this invention.
Figure 3D:
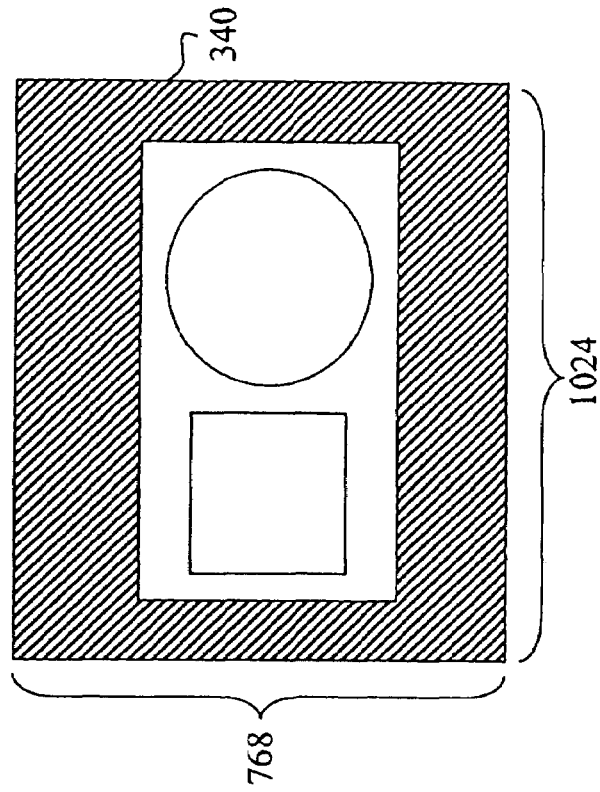
Figure 3C:
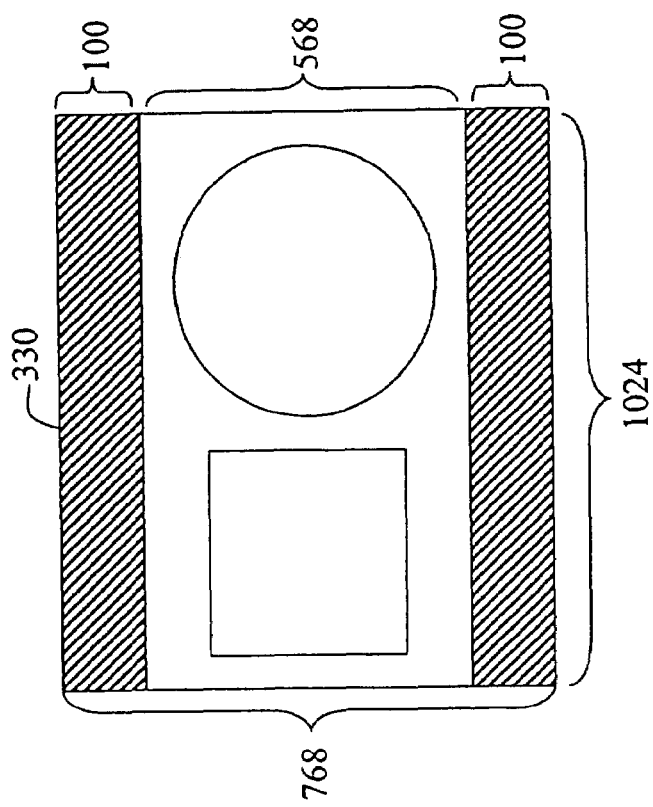

Please refer to FIG. 2 which is an internal circuitry block diagram of a scaler disclosed in this invention. In this circuitry, a video input port 210 receives a video signal 202 input externally and a graphics input port 220 receives a computer video signal 204 input externally. A selection switch 225 selects one of the inputs between the video input port 210 and the graphics input port 220 and transmits the selected input signal to a scaling engine 230 after video decoding and/or analog-to-digital (A/D) converting of the selected input signal. Wherein, video input port 210 performs the video decoding and A/D converting functions for the video signal 202 and the graphics input port 220 performs the A/D converting function for the computer video signal 204. The term "video" is used, hereafter, to refer to a video including a computer video in a broad sense in the following specification.

The scaling engine 230 is coupled to a frame buffer memory 240 which serves the scaling engine 230 with a buffer unit for frame rate conversion and image transformation of a video signal. The scaling engine 230 is equipped with parameter memories (registers) of a CAP_L 261, a CAP_W 262, a CAP_T 263, a CAP_H 264, a DP_L 266, a DP_W 267, a DP_T 268, a DP_H 269, a SF_H 231 and a SF_V 232. The values of the CAP_L 261, the CAP_W 262, the CAP_T 263 and the CAP_H 264 are used for setting a left side, a horizontal capture image length, a top side and a vertical capture image length of an image capture area 420, respectively. The values of the DP_L 266, the DP_W 267, the DP_T 268 and the DP_H 269 are used for setting a left side, a horizontal display length, a top side and a vertical display length of an output display area 510, respectively. The values of the SF_H 231 and the SF_V 232 are used for setting a horizontal scaling factor and a vertical scaling factor, respectively.

The scaler 200 receives a control signal of a micro-controller 270 via a host interface 260. The micro-controller 270 electrically connects with an instruction input device 290 (such as a control panel or a remote controller). The instruction input device 290 can input a control setting signal to the micro-controller 270. The micro-controller 270 converts the identified control setting signal to the control signal and then transmits to the scaler 200 to set corresponding parameter memories (registers) of the scaling engine 230.

Signals processed by the scaling engine 230 are processed by a display port 250 and then outputted to a digital display element (not drawn). The display port 250 further comprises a display port timing generator 252 for generating required timing signals of the digital display element, such as a clock signal (DP_CLK), a data enable signal (DH_DE), a horizontal synchronization signal (DH_SYNC), and a vertical synchronization signal (DV_SYNC), etc. Besides the timing signals generated by the display port timing generator 252, the display port 250 also provides the output image signals via signals RE[0~7], GE[0~7], BE[0~7], RO[0~7], GO[0~7] and BO[0~7] which combined with the timing signals to form a display image signal for displaying an output image on the digital display panel.

Figures 4, 5:
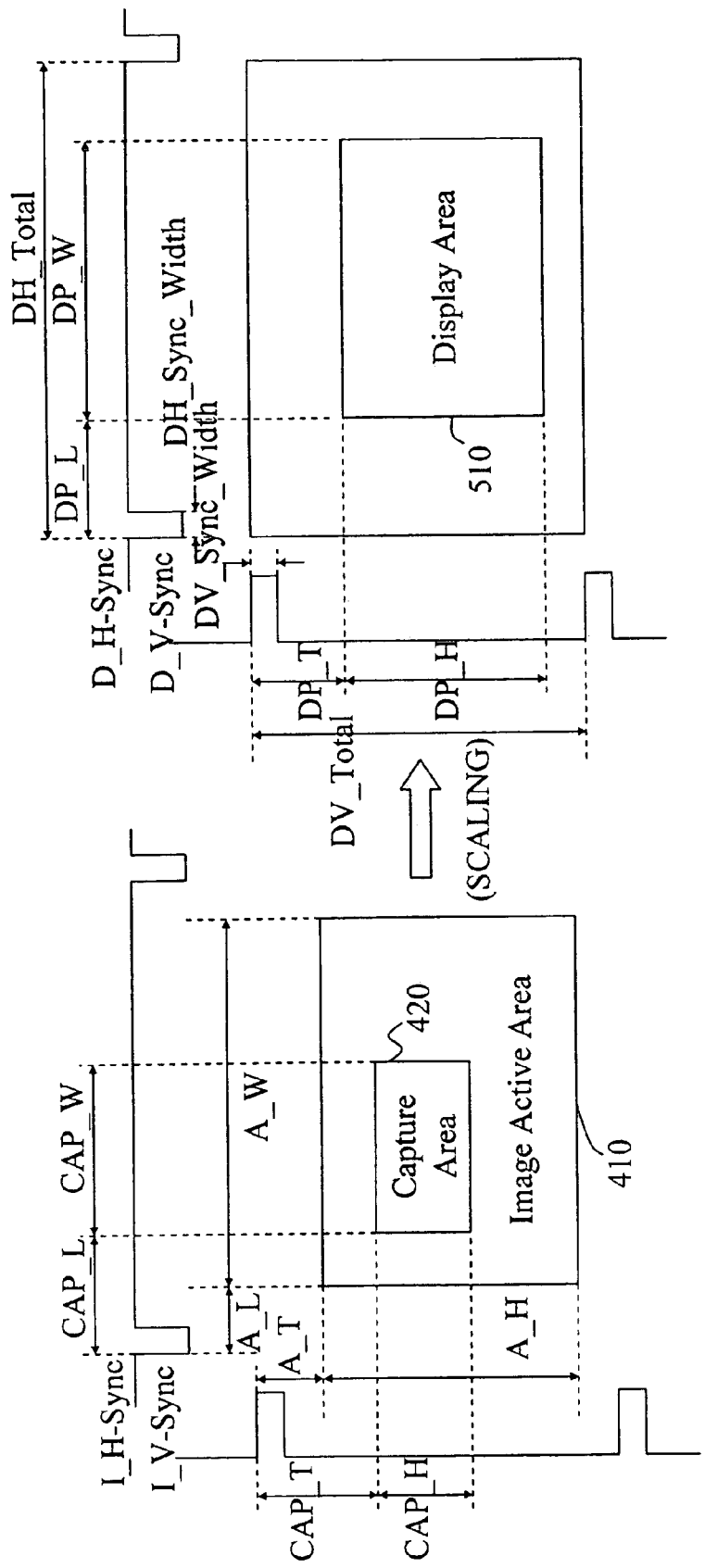
FIG. 4 is a timing setting diagram of capturing input signals by a scaler of each display apparatus of a display wall.
FIG. 5 is a timing setting diagram of setting output display signals of a scaler of each display apparatus of a display wall.

Please refer to both FIG. 4 and FIG. 5 which show preferred embodiments of timing setting diagrams of each display apparatus of a display wall and a method for image adjustment of this invention.

FIG. 4 is a timing setting diagram of capturing input signals by a scaler of each display apparatus of a display wall. FIG. 5 is a timing setting diagram of setting output signals of a scaler of each display apparatus of a display wall. Please refer to FIG. 4 first. An I_H-Sync and an I_V-Sync are a horizontal synchronization signal and a vertical synchronization signal of an input video signal, respectively. An active data area 410 uses a symbol A_L (active left) as a mark of a distance (in a unit of CLK) between a left side of the active data area 410 and a front edge of the corresponding horizontal synchronization signal (I_H-Sync). A symbol A_W (active width) is used as a mark of an active data width (in a unit of CLK) of the active data area 410. A symbol A_T (active top) is used as a mark of a distance (in a unit of Line) between a top side of the active data area 410 and a front edge of the corresponding vertical synchronization signal (I_V-Sync). A symbol A_H (active height) is used as a mark of an active data height (in a unit of Line) of the active data area 410.

Please refer to FIG. 4. An image capture area 420 uses values of a CAP_L, a CAP_W, a CAP_T and a CAP_H for setting a left side, a horizontal capture image length, a top side and a vertical capture image length of the image capture area 420, respectively. In similar, the left side and the top side correspond to the front edge of the horizontal synchronization signal (I_H-Sync) and the front edge of the vertical synchronization signal (I_V-Sync), respectively. The unit for both CAP_L and CAP_W is in clock cycles (CLK) and the unit for both CAP_T and CAP_H is in lines. The image capture area 420 is a part of the active data area 410. The scaler captures an image data content marked as the image capture area 420 by setting an internal set of image capture registers (i.e., CAP_L/CAP_W/CAP_T/CAP_H). An output display video signal is generated after scaling by the scaler and the required timing signals for external display elements are generated by the display port. Please refer to FIG. 5 for setting the output timing signals of the display port timing generator of the display port.

In FIG. 5, a D_H-Sync is an output horizontal synchronization signal whose cycle time and a synchronization signal width can be set by a DH_Total and a DH_Sync_Width in a unit of an output clock Output_CLK, respectively. AD_V-Sync is an output vertical synchronization signal whose cycle time and a synchronization signal width can be set by a DV_Total and a DV_Sync_Width in a unit of a line, respectively. The actual output display area is shown in an output display area 510 whose left side/horizontal display length/top side/vertical display length are set by DP_L/DP_W/DP_T/DP_H, respectively. Similarly, the left side and the top side correspond to the front edge of the horizontal synchronization signal and the front edge of the vertical synchronization signal, respectively. The unit for both DP_L and DP_W is in output clocks (Output_CLK) and the unit for both DP_T and DP_H is in lines. In general, the output timing signals must be set according to the timing specification of the external digital display element. For a selected external display element, the timing parameters in FIG. 5 are a set of fixed parameter values.

For a general application of displaying an image using digital display elements, a scaling function of a scaler is achieved by setting an image capture area in FIG. 4, setting output timing signals in FIG. 5, and setting a horizontal scaling factor (i.e., SF_H) and a vertical scaling factor (i.e., SF_V) of an image transformation simultaneously, wherein the horizontal scaling factor SF_H is (DP_W/CAP_W) and the vertical scaling factor SF_V is (DP_H/CAP_H). The scaling factor is not only related to the size of the output display area but also to the size of the image capture area. The scaling factor setting in a new generation scaler can be precisely to a pixel in horizontal and a line in vertical (in terms of the input image resolution).

When each display apparatus adjusts an image according to parameter settings of the scaler, the DP_W and the DP_H in FIG. 5 are a set of fixed parameter values (in general, the values are resolution numbers of horizontal pixels and vertical lines of an external digital display element). The image size and position are then set in the scaler. For example, a set of values in image capture registers (i.e., the corresponding values of CAP_L, CAP_W, CAP_T, and CAP_H in FIG. 4), a horizontal scaling factor SF_H and a vertical scaling factor SF_V are set.

This invention provides an image adjustment method adapted for a display wall. For example, in one selected embodiment either a right side or a left side of the image of a display apparatus of the display wall is fixed and a horizontal capture image length is then adjusted. In another selected embodiment, either a top side or a bottom side of the image of a display apparatus of the display wall is fixed and a vertical capture image length is then adjusted. The image of each display apparatus is then adjusted sequentially to keep whole image consistency of the neighbored images displayed by the display wall. By using the image adjustment method of this invention, the displayed image can achieve a very high precision degree. For example, while adjusting the horizontal capture image length of the displayed image of the display apparatus, the adjustment is in a unit of an increment or a decrement of a pixel. While adjusting the vertical capture image length of the displayed image of the display apparatus, the adjustment is in a unit of an increment or a decrement of a line. Consequently, a quite well quality is achieved for the whole neighbored images displayed by the display wall by using this invention.

Figure 7:
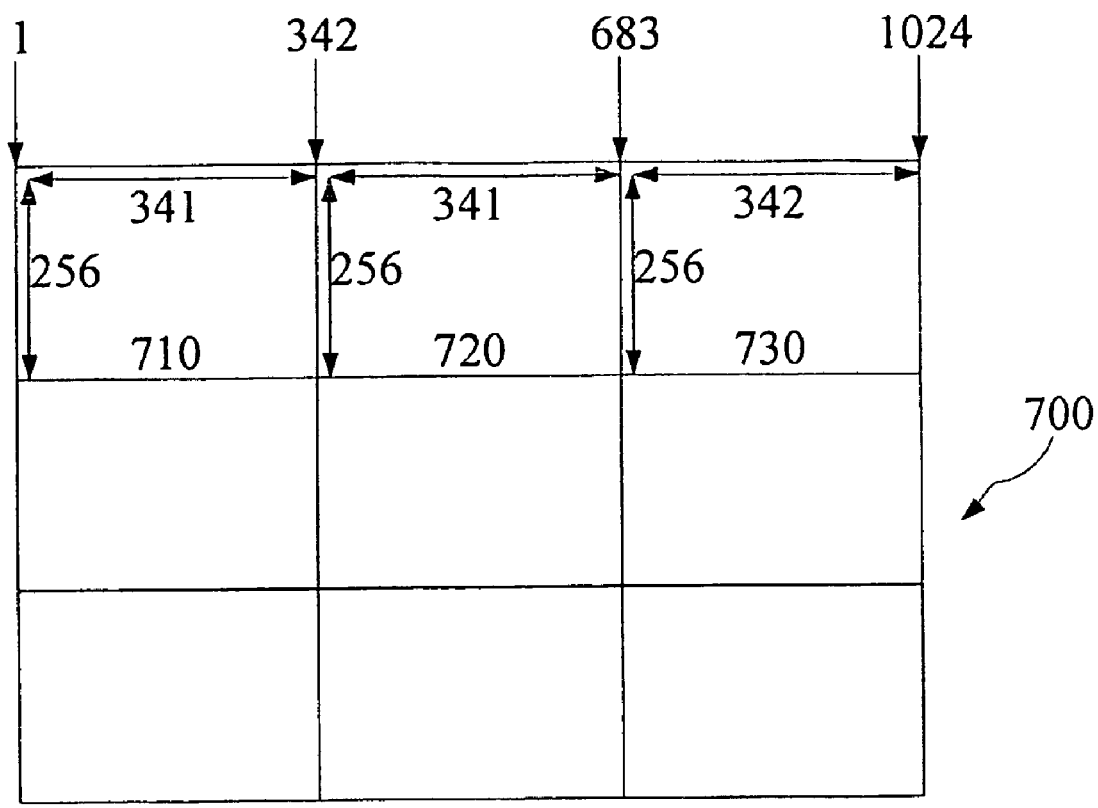
FIG. 7 is a diagram of a division configuration mode according to one embodiment of the subject invention when an image discontinuity occurs between every two adjacent display apparatuses caused by a non-integer image data length generated due to image division.

Please refer to FIG. 7 for the embodiment of setting an initial image capture area of each display apparatus of a display wall. In this embodiment, if an XGA (1024×768) image 700 is scaled to a 3×3 display wall comprising nine display apparatuses, each display apparatus first receives a video signal separately. By proper setting an image capture area for each display apparatus, the video image is then distributed to each display apparatus averagely. If fraction numbers are encountered in calculating process of distributing the image capture area, only the integer part is selected. However, all the active data area of the video image should be distributed to all display apparatuses and sometimes some of the horizontal and/or vertical lengths of image capture areas of the display apparatuses must be increased by one. As shown in FIG. 7, a parameter for a scaler of a first display apparatus is set to a capture area 710 with a size of 341×256, a parameter for a scaler of a second display apparatus is set to a capture area 720 with a size of 341×256, and a parameter for a scaler of a third display apparatus is set to a capture area 730 with a size of 342×256. In this way, distributing the video image to each display apparatus of the display wall can avoid the discontinuity of the images between neighbored display apparatuses caused by lacking or replicating some parts of the displayed images.

After properly setting the initial image capture area for each display apparatus, each display apparatus must scale its initial capturing image to a corresponding digital display element for display.

While setting and combining a video image for display according to said initial image capture area of each display apparatus in the display wall, each individual display apparatus may have the following four adjustment modes and functional requirements:

(1) Fixing left side and adjusting right side (abbreviated as ADJ_RIGHT):

If the left side of a display apparatus has been tightly coupled with the neighbored display apparatus but the right side is discontinuous to the neighbored display apparatus according to a whole image displayed by the display wall, the value of the left side (i.e., CAP_L) of the image capture area of the scaler is fixed, and the value of CAP_W is adjusted with the horizontal scaling factor SF_H been updated to the value of (DP_W/CAP_W) simultaneously.

(2) Fixing right side and adjusting left side (abbreviated as ADJ_LEFT):

If the right side of the display apparatus has been tightly coupled with the neighbored display apparatus but the left side is discontinuous to the neighbored display apparatus according to a whole image displayed by the display wall, the value of the right side (i.e., CAP_L+CAP_W) of the image capture area of the scaler is fixed, and the value of CAP_L is adjusted with the horizontal scaling factor SF_H been updated to the value of (DP_W/CAP_W) simultaneously.

(3) Fixing top side and adjusting bottom side (abbreviated as ADJ_BOTTOM):

If the top side of the display apparatus has been tightly coupled with the neighbored display apparatus but the bottom side is discontinuous to the neighbored display apparatus according to a whole image displayed by the display wall, the value of the top side (i.e., CAP_T) of the image capture area of the scaler is fixed, and the value of CAP_H is adjusted with the vertical scaling factor SF_V been updated to the value of (DP_H/CAP_H) simultaneously.

(4) Fixing bottom side and adjusting top side (abbreviated as ADJ_TOP):

If the bottom side of the display apparatus has been tightly coupled with the neighbored display apparatus but the top side is discontinuous to the neighbored display apparatus according to a whole image displayed by the display wall, the value of the bottom side (i.e., CAP_T+CAP_H) of the image capture area of the scaler is fixed and the value of CAP_T is adjusted with the vertical scaling factor SF_V been updated to the value of (DP_H/CAP_H) simultaneously.

The above four adjustment modes are fixing one side of the image capture area and adjusting opposite side of the image capture area, wherein the adjustment modes (1) and (2,) actually change the horizontal capture image length CAP_W and the horizontal scaling factor SF_H (=DP_W/CAP_W) of the image capture data, and the precision degree of this adjustment is a pixel of the input image which is irrelevant to the scaling factor. Furthermore, the adjustment modes (3) and (4) actually change the vertical capture image length CAP_H and the vertical scaling factor SF_V (=DP_H/CAP_H) of the image capture data, and the precision degree of this adjustment is a line of the input image which is irrelevant to the scaling factor.

Figure 6:
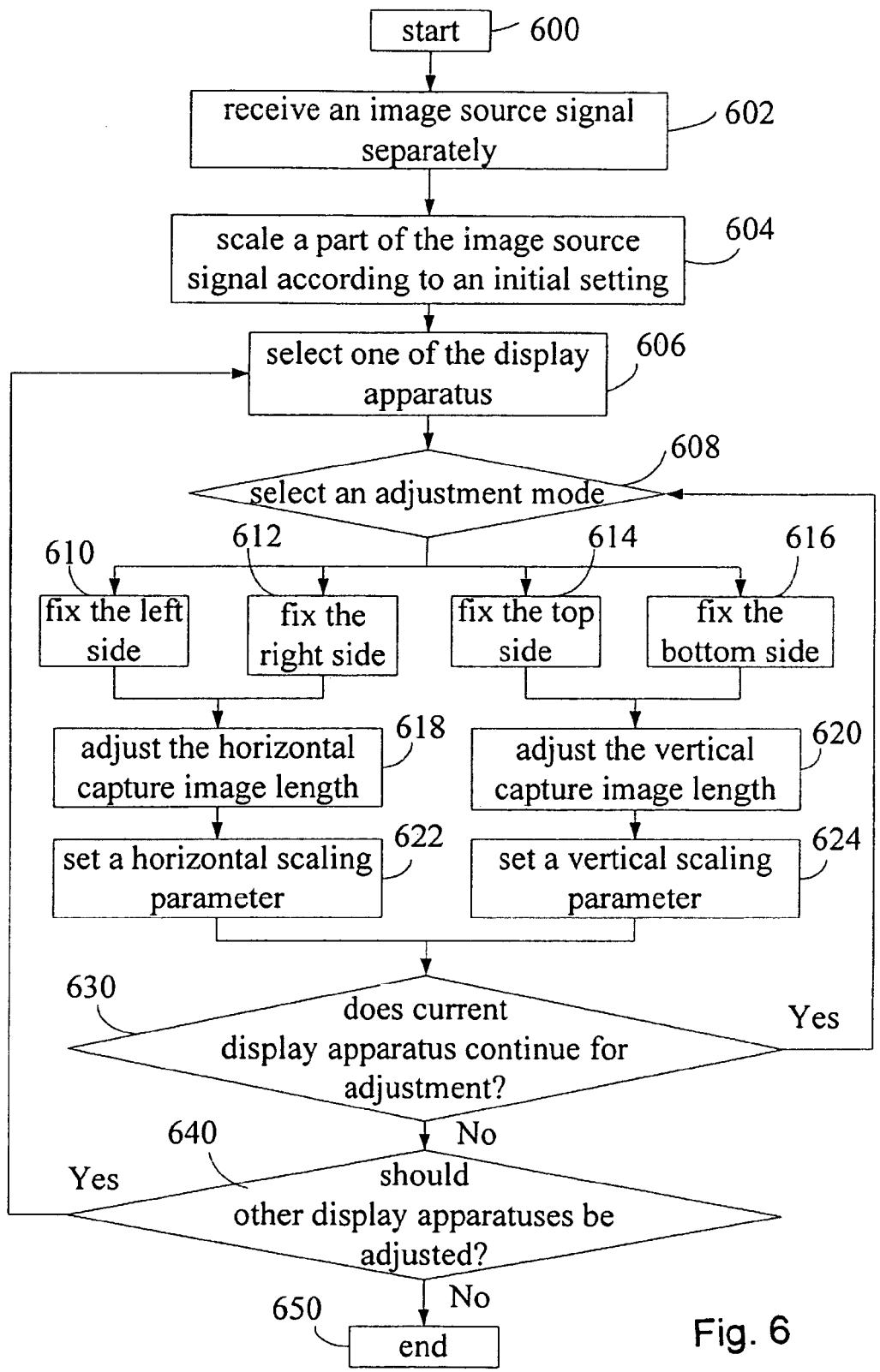
FIG. 6 is a flow chart for an image adjustment method according to one embodiment of the subject invention for individual display apparatuses combined into a display wall.

FIG. 6 shows a flow chart of one embodiment of an image adjustment method according to the subject invention. The flow chart begins with step 600. In step 602, each display apparatus receives a video signal separately. In step 604, each display apparatus scales a part of the video image according to an initial setting of an image capture area and an output display area of an applied display element of each display apparatus to display a complete image of a display wall by combining each image of the display apparatuses. In next step

606, one of the display apparatuses is selected for adjustment. In later step 608, one of the four adjustment modes is selected for adjustment. That is, how to adjust the displayed screen of each display apparatus corresponding to the part of image to be displayed is determined sequentially according to the whole image displayed by the display wall in step 604 for the purpose of achieving a best status of the whole image displayed by the display wall.

According to the embodiment, the method comprises adjusting the position, horizontal capture image length and vertical capture image length of the image capture area corresponding to each display apparatus based on scaling a part of the video image (i.e., step 604) captured by each display apparatus according to an initial setting; setting the horizontal scaling parameter (scaling factor) and the vertical scaling parameter (scaling factor) of a video image display for each display apparatus according to the adjusted horizontal capture image length and vertical capture image length of each display apparatus; and adjusting the image capture area of the next display apparatus. The adjustment for said horizontal capture image length displayed by the display apparatus is in a unit of increasing or decreasing a pixel. The adjustment for said vertical capture image length displayed by the display apparatus is in a unit of increasing or decreasing a line.

According to the preferred embodiment, the said adjustment method first fixes the left side of the image displayed by the display apparatus as shown in step 610 and then adjusts the horizontal capture image length of the displayed image as shown in step 618. The adjustment for said horizontal capture image length displayed by the display apparatus is in a unit of increasing or decreasing a pixel. In next step 622, a horizontal scaling parameter (scaling factor) of the scaler is set by the value of the horizontal display length divided by the adjusted horizontal capture image length.

According to the preferred embodiment, the said adjustment method may first fixes the right side of the image displayed by the adjusting display apparatus of the display wall as shown in step 612 of sequentially adjusting each displayed image displayed by each display apparatus according to a whole image displayed by the display wall and then adjusts the horizontal capture image length of the displayed image as shown in step 618. The adjustment for the horizontal capture image length displayed by the display apparatus is in a unit of increasing or decreasing a pixel. In next step 622, a horizontal scaling parameter (scaling factor) of the scaler is set by the value of the horizontal display length divided by the adjusted horizontal capture image length.

According to the embodiment, the said adjustment method first fixes the top side of the image displayed by the adjusting display apparatus of the display wall as shown in step 614 of sequentially adjusting each displayed image displayed by each display apparatus according to a whole image displayed by the display wall and then adjusts the vertical capture image length of the displayed image as shown in step 620. The adjustment for the vertical capture image length displayed by the display apparatus is in a unit of increasing or decreasing a line. In this adjustment method, a vertical scaling parameter (scaling factor) of the scaler is set by the value of the vertical display length divided by the adjusted vertical capture image length as shown in step 624 when the vertical capture image length of the image displayed by the display apparatus increases or decreases.

According to the embodiment, the said adjustment method first fixes the bottom side of the image displayed by the adjusting display apparatus of the display wall as shown in step 616 of sequentially adjusting each displayed image displayed by each display apparatus according to a whole image displayed by the display wall and then adjusts the vertical capture image length of the displayed image as shown in step 620. The adjustment for the vertical capture image length displayed by the display apparatus is in a unit of increasing or decreasing a line. In this adjustment method, a vertical scaling parameter (scaling factor) of the scaler is set by the value of the vertical display length divided by the adjusted vertical capture image length as shown in step 624 when the vertical capture image length of the image displayed by the display apparatus increases or decreases.

In later step 630, whether current display apparatus continues for adjustment is determined. If the result is "yes", step 608 is executed for continuing in adjusting current display apparatus. If the result is "no", step 640 is executed for determining whether other display apparatuses in the display wall should be adjusted. If the result of step 640 is "yes", step 606 is executed for selecting another display apparatus for adjusting. If the result of step 640 is "no", step 650 is executed to end this adjustment method.

As the adjustment method described above, the whole image in step 604 is provided by an external video source. For the convenience of adjustment, the image content should be a still image containing some simple geometrical patterns (such as circles and oblique lines).

Although the said apparatuses are mainly based on the display apparatuses of the display wall, the technique can be applied for general digital display apparatuses to provide a size fine-tuning function in both a horizontal direction and a vertical direction. While applying for general digital display apparatuses, all four adjustment modes can perform the functions to adjust both image horizontal size and vertical size of the digital display apparatuses by setting the size of the image capture area 420 close to the size of the active data area 410. The precision degree of the adjustment is still a pixel in horizontal and a line in vertical of the input image. Such a size fine-tuning adjustment is not provided in a traditional digital display apparatus. Instead, a set of preset scaling modes are provided for users' selection in the traditional digital display apparatus as described in the related art.

In conclusion, the adjustment technique revealed in this invention has at least the following advantages and features as compared with prior art digital scaling display techniques:

(1) Based on fixing one side of the image for size adjustment, the position of the opposite side is adjusted in the image adjustment application for individual display apparatus of the display wall.

(2) The said adjustment is realized by adjusting the capture position and size of the input image and by fine-tuning the scaling factor, wherein the precision degree of the scaling of this fine-tuning is a pixel in horizontal and a line in vertical of the input image which is irrelevant to the scaling factor of the display apparatus.

As a result of said image adjustment features, the whole displayed image of the display wall combined by display apparatuses can be more perfect and complete by adjusting the image of individual display apparatus of the display wall.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for adjusting an image shown on a display apparatus adapted for a display wall, the display wall comprising a plurality of display apparatuses, each of the display apparatuses having a scaler and a digital display element, the method comprising the steps of:

the display apparatuses receiving a video signal;

setting an initial image capture area in the scaler for selecting and scaling a part of an image frame of the video signal and transmitting the part to the digital display element for display; and choosing one display apparatus of the display wall to adjust the image until all of the display apparatuses are adjusted to present a scaled image of the video signal on the display wall, wherein:

a. when the initial image capture area is adjusted, one side of the initial image capture area is fixed and a size of the initial image capture area is adjusted to form a size of the adjusted image capture area by adjusting another side of the initial image capture area;

b. updating a scaling factor of the scaler according to the size of the adjusted image capture area so that each pixel of the adjusted image capture area is scaled equally horizontally, and each line of the adjusted image capture area is scaled equally vertically, such that the image of the adjusted image capture area fits an output display area of the digital display element of the display apparatus;

wherein a horizontal unit for adjusting the initial image capture area is a pixel of the image frame and a vertical unit for adjusting the initial image capture area is a line of the image frame.

2. The method of claim 1, wherein the initial image capture area is set by choosing the part of the image frame of the video signal corresponding to a position of the display apparatus in the display wall.

3. The method of claim 1, wherein the side to be fixed is one of a top side, a bottom side, a left side, and a right side of the initial image capture area.

4. The method of claim 1, wherein the scaler of each of the display apparatuses outputs a display image signal for displaying an image on the digital display element according to a resolution of the digital display element.

5. The method of claim 1, wherein the image adjustment of the display apparatuses is executed after an instruction for adjustment is received.

6. A display wall, comprising:

a plurality of display apparatuses for receiving a video signal, each of the display apparatuses comprising:

a digital display element;

an instruction input device for receiving an instruction for adjustment; and a scaler, electrically connected to the instruction input device, for receiving the video signal and outputting a display image signal to the digital display element after processing the video signal, the scaler being provided with a plurality of registers for setting the display image signal, a plurality of registers for choosing an image capture area of the video signal, and a register for setting a scaling factor;

wherein each of the display apparatuses chooses a part of an image frame of the video signal by setting initial capture registers of the scaler, and scales the part to a size of the display apparatus by setting the scaling factor of the scaler;

each of the display apparatuses adjusting the image after receiving the instruction to present a scaled image of the image frame of the video signal on the display wall:

a. based on an initial image capture area defined by the initial capture registers, one side of the initial image capture area being fixed and a size of the initial image capture area being adjusted to form a size of an adjusted image capture area by adjusting another side of the initial image capture area;

b. updating a scaling factor of the scaler according to the size of the adjusted image capture area so that each pixel of the adjusted image capture area is scaled equally horizontally, and each line of the adjusted image capture area is scaled equally vertically, such that the image of the adjusted image capture area fits an output display area of the digital display element of the display apparatus;

wherein a horizontal unit for adjusting the initial image capture area is a pixel of the image frame and a vertical unit for adjusting the initial image capture area is a line of the image frame.

7. The display wall as claimed in claim 6, wherein the initial image capture area of each of the display apparatuses is set by choosing the part of the image frame of the video signal corresponding to a position of each of the display apparatuses in the display wall.

8. The display wall as claimed in claim 6, wherein the side to be fixed is one of a top side, a bottom side, a left side, and a right side of the initial image capture area.

9. The display wall as claimed in claim 6, wherein the scaler of each of the display apparatuses outputs the display image signal for displaying an image on the digital display element according to a resolution of the digital display element.

10. A display apparatus for adjusting an image horizontally and vertically, comprising:

a digital display element;

an instruction input device for receiving an instruction for adjustment; and a scaler, electrically connected to the instruction input device, for receiving a video signal and outputting a display image signal to the digital display element after processing the video signal, the scaler being provided with a plurality of registers for setting the display image signal, a plurality of registers for choosing an image capture area of the video signal, and a register for setting a scaling factor;

wherein the scaler outputs the display image signal according to a resolution of the digital display element, and the display apparatus chooses a part of an image frame of the video signal to fit the size of the display image of the display apparatus by setting initial capture registers of the scaler;

the display apparatus adjusting the image after receiving the instruction:

a. based on an initial image capture area defined by the initial capture registers, one side of the initial image capture area being fixed and a size of the initial image capture area being adjusted to form a size of an adjusted image capture area by adjusting another side of the initial image capture area; and b. updating a scaling factor of the scaler according to the size of the adjusted image capture area so that each pixel of the adjusted image capture area is scaled equally horizontally, and each line of the adjusted image capture area is scaled equally vertically, such that the image of the adjusted image capture area fits an output display area of the digital display element of the display apparatus;

wherein a horizontal unit for adjusting the initial image capture area is a pixel of the image frame and a vertical unit for adjusting the initial image capture area is a line of the image frame.

11. The display apparatus as claimed in claim 10, wherein the side to be fixed is one of a top side, a bottom side, a left side, and a right side of the initial image capture area.

* * * * *